United States Patent [19]

Ritzinger

[11] 3,859,512
[45] Jan. 7, 1975

[54] RATE METER
[76] Inventor: Karl R. Ritzinger, 211 Sherwood Dr., Manchester, N.H. 03103
[22] Filed: Apr. 26, 1973
[21] Appl. No.: 354,642

[52] U.S. Cl. .... 235/151.3, 235/92 DM, 235/92 TF, 235/152, 324/78 D
[51] Int. Cl. ...................... G06m 3/06, G01n 23/10
[58] Field of Search ........ 235/151.3, 196, 195, 194, 235/152, 92 T, 92 TF, 92 DM, 92 PE, 92 FQ; 324/78, 780

[56] References Cited
UNITED STATES PATENTS
3,541,311 11/1970 Taylor .............................. 235/92 TF
3,578,960 5/1971 Georgi et al. .................... 235/92 FQ
3,603,769 9/1971 Malcolm ..................... 235/92 FQ X
3,609,326 9/1971 Bagley et al. ....................... 235/152
3,729,996 5/1973 Metz ............................. 235/92 DM Primary Examiner—Joseph F. Ruggiero
Attorney, Agent, or Firm—Thomas N. Tarrant

[57] ABSTRACT

A rate meter using two consecutive input pulses to gate clock pulses into a counter and then using the counter output as a divisor of a fixed count to arrive at the input frequency rate determined as the reciprocal of the period. The relation of the fixed count to the clock frequency is predetermined so as to provide the answer scaled to the preferred units.

7 Claims, 3 Drawing Figures

Patented Jan. 7, 1975

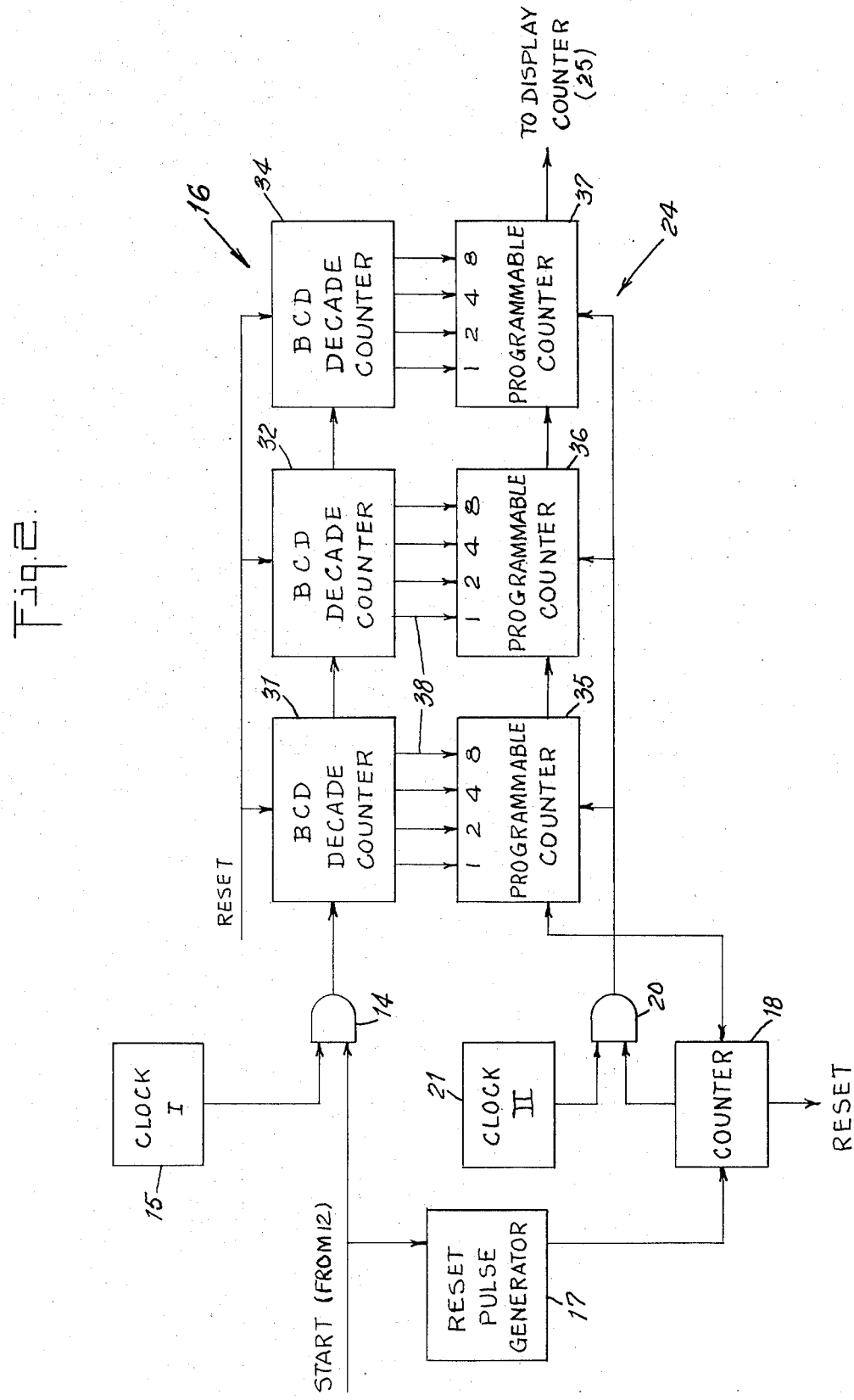

RATE METER

BACKGROUND OF THE INVENTION

1. Field of the Invention

The present invention relates to rate meters for determining the repetition rate of recurring events and particularly to such a meter for determining such rate on the basis of the lapse between any consecutive two of such events.

2. Description of the Prior Art

One of the simpler forms of a rate meter is a tachometer in which a spring loaded dial is magnetically coupled to a rotating magnet such that the dial reads in revolutions per minute or other appropriate scale. Another simple form of rate meter uses an RC network in which the capacitor reaches a charge upon the occurrence of each event and loses its charge at a predetermined rate inbetween events so that the average charge on the capacitor is proportional to the frequency and can be read on a voltage meter calibrated in terms of frequency. At very low frequencies, devices of the two types just mentioned become inaccurate and when redesigned so as to provide more accuracy usually provide a lag in indicating frequency change.

At very low frequency rates counted in events per minute or per hour, it becomes desirable to determine the rate upon the occurrence of two consecutive events in order to obtain a fast reading and to avoid the need for determining rate by averaging a large number of events. In some rate meters it is desirable to indicate immediately a change in rate. This can be true for example in meters indicating the human pulse rate or radioactivity.

U.S. Pat. No. 2,735,066 to Corl et al discloses an interesting modification of the RC time constant network driving a voltage meter. Two RC networks are used and on an input pulse one of the RC networks starts charging and continues to do so until the next event occurs. Upon the next event, the capacitor is switched to connect to the voltage meter being simultaneously disconnected from the charging network. At the same time the capacitor of the other RC network is fast discharged and then connected to the charging network. Upon the next event the switching reverses so that at all times the voltage meter is reading a charge determined by the time interval between the two preceding events. At really low rates some inaccuracy results due to internal leakage in the capacitors and due to current consumed in operating the voltage meter. With a high impedance voltage meter and low leakage capacitors, considerable accuracy can be obtained. The rate meter of Corl is an analog type and more recent rate meters have been largely digital to facilitate electronic digital readout.

U.S. Pat. No. 2,769,595 to Bagley counts input pulses (events) over a predetermined gate interval then resets and starts over. It has the usual difficulties at low rates providing either inaccurate count or else a long delay before accurately giving a count or change in count.

U.S. Pat. No. 3,263,064 to Lindars discloses a circuit intended to serve the same purpose as the present invention but requiring a large number of fixed frequencies.

SUMMARY OF THE INVENTION

In accordance with the present invention any two consecutive events control a gate on and off passing clock pulses of a fixed frequency through to a counter during the interval between the two events. Programable counters are then utilized to provide a dividing function in which a predetermined block of pulses is divided by the gated count to provide a digital output K/T in which T is the period of the events and K is determined by the relation of the number of pulses in the block of pulses to frequency rate of the clock so as to provide appropriate units such as pulses per second or pulses per minute. The combination of this circuit with a human pulse sensor provides a pulse rate meter showing instantaneous changes in pulse rate. In one preferred embodiment an automatic reset provides a new count on each new arriving event so that no events are lost in the process of counting. Thus it is an object of the invention to provide a novel rate meter for determining the rate of events by the time lapse between any two consecutive events.

It is a further object of the invention to provide a high accuracy rate meter for events lower than 10 per second.

A further object of the invention is to provide a rate meter in which a programable counter is used to divide a fixed count by a count determined by the time interval between consecutive events.

It is a further object of the invention to provide a novel rate meter to provide an independent displayed rate for each time interval between events.

Further objects and features of the invention will be understood upon reading the following description together with the drawing.

BRIEF DESCRIPTION OF THE DRAWING

FIG. 2 is a more detailed block diagram of counter 16, divider 24 and the signal sources driving them.

DESCRIPTION OF THE PREFERRED EMBODIMENT

Figure 1:
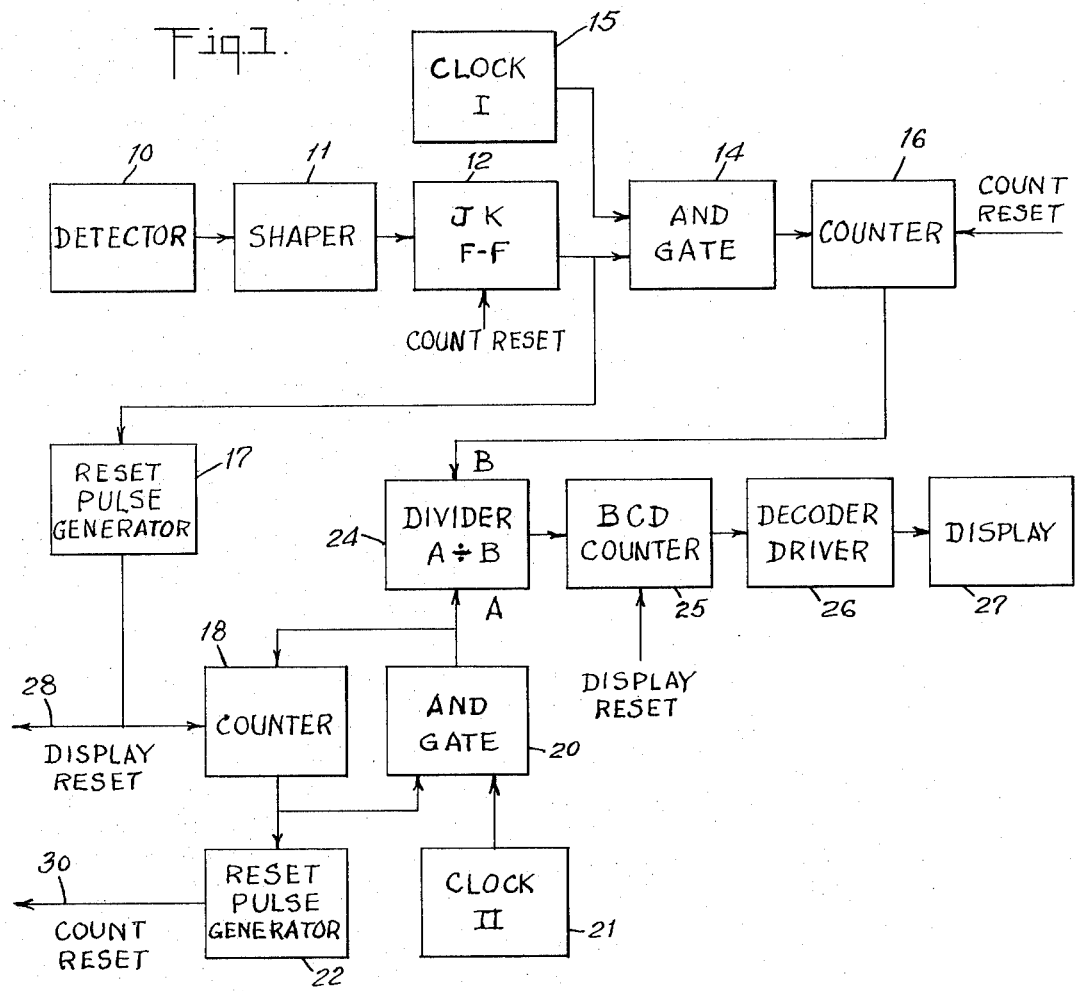
FIG. 1 is a block diagram of the inventive rate meter.

The rate meter according to the present invention can be used to detect the rate of occurrences of a wide range of events. These events can be sensed by the operation of microswitches, by sensing change in a magnetic field, by photodetection or even direct detection of electrical waves or pulses. Thus, in FIG. 1 the input to the rate meter is depicted as detector 10 and shaper 11. The shaper is usually necessary since the detector does not always provide optimum pulses for triggering JK flip-flop 12. Detector 10 and shaper 11 are connected to JK flip-flop 12 to change its state upon each detected event. Flip-flop 12 is connected to AND gate 14 to enable the AND gate during one state of the flip-flop and disable it during the other state. Clock 15 is a source of fixed frequency pulses also connected as an input to AND gate 14 so as to be passed on to period counter 16 when gate 14 is enabled by flip-flop 12. Period counter 16 is connected to divider 24 to provide divisor input B. When flip-flop 12 flips to the state disabling gate 14, its output is also connected to drive reset pulse generator 17, the output of which resets counter 18. Display reset output 28 of generator 17 is also connected to counter 25 for display 27 driving the display to zero. Counter 18 is connected to AND gate 20 to provide an enable signal to gate 20 except when counter 18 is at full count. Counter 18 is a counter that counts to a predetermined count and then stops until reset. The output of AND gate 20 is connected as the input to counter 18 and also as the dividend input A to divider 24. It will be seen that when counter 18 is reset AND gate 20 passes clock pulses from clock 21 until the number of pulses reaches the predetermined count of counter 18. The output of counter 18 is also connected to reset pulse generator 22. Upon reaching its predetermined count, counter 18 is connected to drive generator 22 so as to provide a count reset pulse on lead 30. The count reset is connected to the reset input of flip-flop 12 so as to change the state of flip-flop 12 in the same manner as if an event pulse had come in from detector 10. The output of divider 24 is connected to BCD counter 25 which in turn is connected to decoder driver 26 connected to drive display 27 such as an illuminated segment display, LED display or the like.

FIG. 2 depicts a preferred embodiment for providing the function A divided by B. Thus, in FIG. 2 counter 16 is depicted as three decade counters 31, 32 and 34 and divider 24 is three programable counters 35, 36 and 37. An example of suitable programable counters is the programable modulo-N decade counter available from Motorola, Inc., Semiconductor Products Division under the product designation MC4016P.

As depicted in FIG. 2 the binary coded decimal count in each of counters 31, 32 and 34 is connected by leads 38 to the programing inputs of counters 35, 36 and 37 respectively. This programs counter 24 to divide a count introduced on the signal input of counter 24 by the count applied to the programing inputs. Counter 16 counts clock signals gated from clock 15 and connected to counter 31. Counter 31 then represents units. Counter 32 is connected to counter 31 to provide Tens count and counter 34 is connected to counter 32 to provide Hundreds count. Depending upon the frequency of clock 15 and the preset count of counter 18 an additional counter or counters can be interposed between gate 14 and counter 31 for scaling purposes.

The output of programable counter 24 is connected to the display section.

Figure 3:
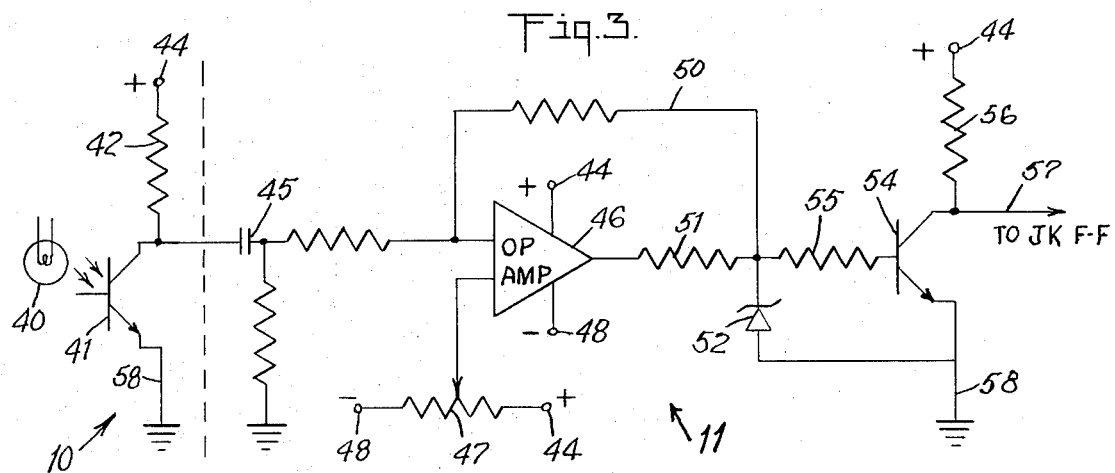
FIG. 3 is a schematic diagram of an embodiment of detector 10 and shaper 11 of FIG. 1 suitable for detecting the human pulse rate.

FIG. 3 depicts a detector suitable for detecting the human pulse. Detector 10 is an electrooptical device for sensing human pulses using an illumination source 40 such as an incandescent bulb associated with a photo transistor 41 or similar light detecting device. The collector of the transistor 41 is connected through a load resistor 42 to one side of a battery 44 while the emitter of transistor 41 is connected through reference 58 to the other side of battery 44. The use of photo-sensing avoids any metallic connection to the human body and the use of battery 44 avoids the necessity of any connection to external electrical power. The collector of transistor 41 is connected to shaper 11 through a direct current isolating capacitor 45.

In FIG. 3 shaper 11 is depicted as a conventional operational amplifier version of a Schmitt trigger terminating with the collector output of transistor 54 for connection to JK flip-flop 12 by lead 57. For some purposes it is desirable to have detector 10 connected to the rate meter through an extended flexible lead. For this purpose shaper 11 may readily be physically combined either with detector 10 or the main portion of the rate meter. It will be seen also that there is no need for the same battery 44 to be used for detector and shaper.

Additional isolation for safety purposes can readily be added in the form of an electrooptical coupler either between detector 10 and shaper 11 or between shaper 11 and flip-flop 12.

The present rate meter accurately performs the calculation:

$$F = K/T$$

Where F equals frequency; K is a constant used to scale the quotient into desired units to obtain frequency in terms of events per second, per minute, or per hour etc; and T is time measured as the period of recurring events. Thus, if F is to be measured in events per minute and T is to be counted in milliseconds, then K must be 60,000.

In operation, a first pulse, indicating an event detected by detector 10, causes flip-flop 12 to change states providing an enable signal to gate 14. Clock pulses from clock 12 commence passing through gate 14 to counter 16.

When the rate meter is operated from a 60Hz AC line, clock 15 may use the AC line as a synchronizing frequency. In battery operation a stable oscillator is required. For purposes of this description, clock 15 may have a pulse rate of 12 pulses per second.

Now a second event is detected and flip-flop 12 changes state disenabling gate 14. Assuming 1 and ½ seconds have elapsed, counter 16 will stop with a count of 18.

The disable signal to gate 14 also drives reset pulse generator 17 which resets counter 18 and the display. Counter 18, when reset to zero, enables gate 20. Gate 20 passes pulses from clock 21 to divider 24 and to counter 18. Clock 21 is ). This a free running oscillator with a frequency in the range of 1 to 10 MHz and counter 18 for purposes of this description counts to a fixed count of 7,200. 7,200 clock pulses from clock 21 are thus applied to divider 24 and counter 18 disables gate 20. The 7,200 pulses representing the A input to divider 24 are divided by the B input from counter 16 and applied to counter 25 driving display 27. In this case the quotient is 400 (7,200 ÷ 18). This number 400 in the depicted embodiment will be represented in binary coded decimal. Decoder 26 decodes for driving a decimal display.

The display, for purposes of this description, has a fixed decimal point one position to the left in a three digit display. Thus, the display will read 40.0 (events per minute).

Counter 18, on reaching its full count, also drives reset pulse generator 22 providing count reset signals both to counter 16 and flip-flop 12. Flip-flop 12 sees this as another "event" and the count begins over. The purpose of the "count reset" is to allow a rate calculation for every lapse between events. Rate would be calculated only for every other lapse without the "count reset" between events.

Since Dividend A is generated following a time lapse between two events, it utilizes time from the next time lapse and the time consumed after "display reset" and before "count reset" results in lost count. However, with clock 21 operating in a megahertz region, this time consumed is only milliseconds and at low repetition rates the lost count is negligible. In using the rate meter for metering rates of ten per second and faster, the "count reset" is omitted or disabled. At these higher rates the loss of a calculation for every other lapse between events is of no consequence.

In order to read events per hour or per second, the fixed count of counter 18 can be changed by a factor of 60 up or down respectively. Similar results can be obtained by changing the frequency of clock 15 or scaling its output.

While the invention has been described with relation to a specific embodiment, the functional organization is contemplated as inventive as well as the particular components utilized to provide the functions and it is intended to cover the invention within the scope of the following claims.

I claim:

1. A method of metering the rate of recurring events comprising:
   a. gating clock signals into a period counter during an event period defined by two consecutive events to obtain a divisor;
   b. dividing a predetermined fixed dividend by said divisor to obtain a quotient;
   c. applying said quotient to drive a display; and,
   d. repeating the above steps for at least every other event period, the relation of the frequency of said clock signals to the count of said fixed dividend being determined to provide a display rate in conventional time units.

2. A method according to claim 1 wherein said dividing is performed by applying said divisor in parallel to the program inputs of a cascaded programable modulo-N counter and then applying said dividend to said programable modulo-N counter as a block of sequential pulses.

3. A method according to claim 1 wherein said fixed dividend is provided by gating a source of clock pulses by a predetermined count of a fixed counter.

4. A method according to claim 3 wherein said dividing commences upon a reset signal to said fixed counter simultaneously resetting said display and said dividing terminates upon said fixed counter reaching its fixed count simultaneously resetting said period counter.

5. A ratemeter for displaying the rate of recurring events derived from the period of recurrence comprising:
   a. A detector connected to detect the occurrence of said events;
   b. means responsive to said detector connected to an AND gate to enable said AND gate upon the occurrence of a first of said events and disable said AND gate on the occurrence of the next consecutive one of said events;
   c. a source of clock signals connected by said AND gate to a period counter;
   d. an output from said period counter connected as a divisor input to a divider;
   e. a fixed dividend generator;
   f. an output from said dividend generator connected as a dividend input to said divider; and
   g. display means connected to the output of said divider to display a quotient representative of the rate of said recurring events.

6. A ratemeter according to claim 5 wherein said divider is a programable counter and said output from said period counter is a binary coded decimal output connected in parallel to parallel inputs of said programable counter.

7. A ratemeter according to claim 6 wherein said dividend generator comprises an oscillator, a second AND gate and a fixed counter, the fixed counter and oscillator connected as inputs to said second AND gate and said second AND gate connected to provide an input to the divider and an input to the fixed counter whereby when the fixed counter is reset, said second gate passes pulses from said oscillator as a serial input to said divider until the fixed count of said fixed counter is reached.

* * * * *